United States Patent [19]

Choquet et al.

[11] 3,747,024

[45] July 17, 1973

[54] MEMORY CONTROLLED MULTIPLE PHASE SHIFT MODULATOR

[75] Inventors: Michel F. Choquet, Les Pins Vence; Henri J. Nussbaumer, Lagaude, both of France

[73] Assignee: International Business Machines Corporation, Armonk, N.Y.

[22] Filed: Oct. 26, 1971

[21] Appl. No.: 193,813

[30] Foreign Application Priority Data

Oct. 29, 1970 France .............................. 7040292

[52] U.S. Cl. ............... 332/9 R, 325/38 B, 325/163, 332/16 R, 332/42

[51] Int. Cl. .............................................. H04l 27/20

[58] Field of Search .................. 332/9 R, 9 T, 11 R, 332/11 D, 42; 325/30, 38 R, 38 A, 38 B, 163; 178/66, 67, 88; 179/15 BC

[56] References Cited

UNITED STATES PATENTS

| | | | |
|---|---|---|---|
| 3,621,403 | 11/1971 | Seiy | 332/9 R |
| 3,636,260 | 1/1972 | Choquet | 179/15 BC |
| 2,905,812 | 9/1959 | Doelz et al. | 332/9 R X |
| 3,452,297 | 6/1969 | Kelly et al. | 325/38 R X |

*Primary Examiner*—Alfred L. Brody
*Attorney*—Robert B. Brodie

[57] ABSTRACT

In a multiple phase or differential phase modulator encoding successive groups of N digital data bits occurring at data rate 1/T into signals of the form (sin X/X) cos $(wt + \phi_i)$, wherein each encoded signal exercises a progressively diminishing intersignal interference of time duration RT. The modulator includes an addressable memory where coded phase shift increments $\Delta\phi = k2\pi/M$ ($k = 0, 1, 2$ ----M−1) are stored and which upon extraction are applied to an output signal combining network. Each incoming digital data group is converted into one of $2^N = M$ raw memory addresses. The $i^{th}$ address is modified by logically combining it with $i^{th} - 1$ previous address and by extracting it and the contents of the $i - (R-1)$ previous addresses to form a summed or composite signal in the time period prior to processing the $i^{th} + 1$ raw memory address, the contents of the modified address constituting in effect a signal predistorted to compenstate for the intersignal interferences of the R previous signals.

4 Claims, 7 Drawing Figures

INVENTORS
MICHEL F. CHOQUET
HENRI J. NUSSBAUMER

BY Robert Bruce Brodie
ATTORNEY

MEMORY CONTROLLED MULTIPLE PHASE SHIFT MODULATOR

BACKGROUND OF THE INVENTION

This invention relates to multiple and differential phase shift modulators, and more particularly to modulators encoding signals in the form (sin X/X) cos $(wt + \phi_i)$ utilizing the "echo modulation" technique.

It is known, for example, from copending application Ser. No. 35,758, filed May 8, 1970, now U.S. Pat. No. 3,636,260 issued Jan. 18, 1972 entitled "A Data Transmission System," that signals of the form (sin X/X) cos $(wt + \phi_i)$ may be used for phase or differential phase shift modulation. This reference shows that such signals may be suitably sampled and approximated by successive pulse amplitudes or by a digital delta coded pulse train. The latter coded form advantageously permits storage in digital memories and analog signal reconstruction using delta demodulators.

It is noted that signals of the form (sin X/X) cos $(wt + \phi_i)$ will exhibit intersignal interference on a serial transmission line because the "echos" of one signal occur at the same time the "echos" of another signal are being generated. One may recall that the amplitude vs. time waveform diagram of this signal is characterized by a major bell shaped excursion and several minor excursions distributed approximately symmetrical about the bell shape. The minor excursions diminish in amplitude as one moves either forward or backward along the time axis away from the major excursion. Generally, it may be said that the "echos" occur over an interval of RT duration, where T is the time between successive encodings and R is an empirical quantity relating to the number of encodings being influenced.

One solution to the interference problem is to encode at a rate no greater than 1/RT. However, the data rate becomes so reduced as to impair the economic attractiveness of high speed data links, i.e., 9,800 bauds per sec. leased from common carriers.

SUMMARY OF THE INVENTION

It is accordingly an object of this invention to devise a multiple or differential phase shift modulator wherein the signal transmission rate is greater than 1/RT even in the presence of intersignal interference caused by the overlapping of successive signals generated on a serial transmission path in point of time. Relatedly, it is another object to devise such a system where the phase shift encoding is of the "echo modulation" type i.e., (sin X/X) cos $(wt + \phi_i)$.

The foregoing objects are satisfied by an illustrative embodiment having an addressable memory in which coded phase shift increments are stored and which upon extraction are applied to a signal combining network. Preferably such stored increments may be in digital delta coded form such that a delta demodulator can be included in the signal combining network. A code converter transforms each group of N incoming digital in base $b$ into a corresponding one of $b^N = M$ *raw memory addresses. The* $i^{th}$ raw address is modified by logically adding to it the $i^{th} - 1$ address. This address is entered into the first position of a shift register and the contents of the associated memory location are extracted. The extracted phase shift increment is assembled in the output signal combining network. At the same time, the code converter is disabled. Now the shift register contains the addresses of the $i^{th} - 1$, $i^{th} - 2$, - - - - $i^{th} - (R\text{-}1)$ that were shifted at the time the modified $i^{th}$ address was entered into the first position. During the time interval between successive enablements of the code converter the memory contents of the $i^{th} - 1$ to $i^{th} - (R\text{-}1)$ addresses will also be extracted and applied to the signal combining network to form a summed signal.

DESCRIPTION OF THE PREFERRED EMBODIMENT

It is advisable to recall first, what is a transmission mode making use of "signal elements."

Figure 1:
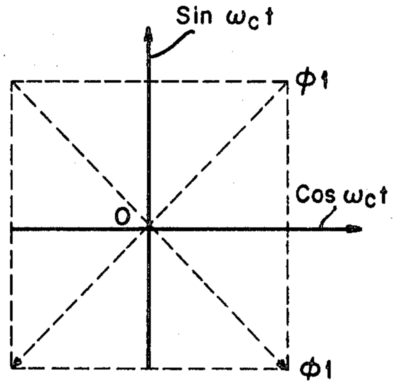

Considering, for instance, four-phase modulation system, it can be used to transmit an information element (which can be called dibit in this case) corresponding to two binary elements, i.e., being able to assume four possible values to which each of the four phases is casued to correspond, respectively. If $f_c$ corresponds to the carrier frequency, then a bit may be sent upon modulation of the cosine channel and the other bit may be transmitted upon modulation of the sine channel. This corresponds to the two possible values on the cosine channel and the two possible values on the sine channels as seen for example in FIG. 1. Mathematically, the digital generations are well-known in the art, and are represented by ± (sin X/X) cos $w_ct$ over the cosine channel and ± (sin X/X) sin $w_ct$, over the sine channel.

Figure 2:
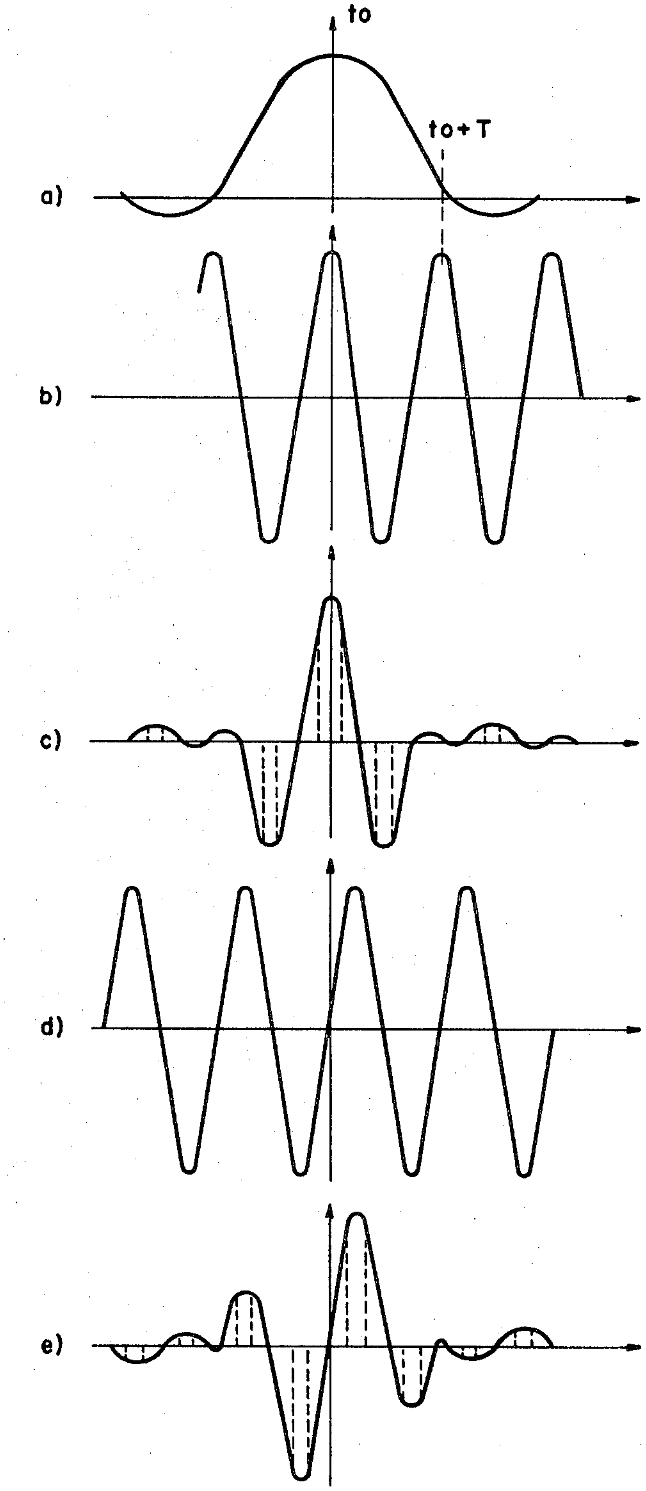
FIGS. 1 and 2 are respectively a vectoral and a time waveform depiction of signals of the form (sin X/X) cos $wt$ and (sin X/X) sin $wt$ used in the "echo" phase modulation technique of the invention.

Referring now to FIG. 2, there is shown a multiple phase modulation system also discussed in copending application Ser. No. 35,758 filed May 8, 1970. In this example (the rate of the information elements, here the dibits, being equal to 1/T), let function $\sin X/X = [\sin (2\pi/2T)\, t]/(2\pi/2T)\, t$ and value $f_c = 1/T$, then FIG. 2a corresponds to the chosen function sin X/X and FIG. 2b corresponds to cos $w_ct$. Also, FIG. 2c corresponds to $$\frac{\sin (2\pi/2T)t}{(2\pi/2T)t} \cos (2\pi/T)t.$$

Likewise, FIG. 2d corresponds to sin $(2\pi/T)\, t$, FIG. 2e corresponding to $$\frac{\sin (2\pi/2T)t}{(2\pi/2T)t} \sin (2\pi/T)t.$$

An assembly of sine and cosine type signals is transmitted; then, one instant T later, another assembly is transmitted. According to the process disclosed in the above-mentioned patent, signals $c$ and $e$ are directly generated by the pulse sequences shown by a dotted line on signals $c$ and $e$; the cosine channel sequences and the sine channel sequences are generated from data in shift registers.

Many (sin $X/X$) cos $f(t)$ and (sin $X/X$) sin $f(t)$ signal combinations are possible, but the complexity increases fairly quickly especially when frequency $f_c$ is not in a simple relation with rate $1/T$ of the information elements.

Here, for one dibit, two "signal elments" are generated which practically act as two components of a summed or combined signal. The direct generation of the summed "signal element" which results for each dibit, might be conceived. Thus, with reference to the case of the previous example, the summed "signal element" which corresponds to one of the vectors shown by a dotted line in FIG. 1 could be generated, said summed signal assuming the following values:

$$\frac{\sin (2\pi/2T)t}{(2\pi/2T)t} [\pm \cos (2\pi/T)t \pm \sin (2\pi/T)t]$$

its four values being defined by combinations ++, +−, −+, −−.

According to the present invention, the signal to be transmitted will also be generated from the known signal elements but said "signal elements" will be put into a coded form; among the coded forms there are more particularly, but not exclusively, the Δ coding, the Δ sigma coding, the pulse code modulations (PCM). Each "information element" to which one, or several given "signal element" must correspond for the chosen transmission type, will cause the successive generation of the "code elements" corresponding to this, or these, "signal element(s)." It should be noted here, that the different above-mentioned codes can be represented by a digital "image"; therefore, this means that storing said "images" is equivalent to storing in their coded forms, the different "signal elements" to be used.

The direct consequence of this fact is that, when considering an "information element," the latter will cause the generation of the "signal elements" which must correspond to it, by causing the elements of which the "image(s)" is made, to be read from the memory, each "image element," thus read, causing the code element of which it is representative, to be generated, each succession of the so-reconstituted code elements reproducing its "signal element," the latter being if need be, put back into its analog form by the appropriate decoder.

It is well-known that the signal to be transmitted results from the combination of the various "signal elements" according to the sequence required by the chosen transmission mode; therefore, this sequence formed by the succession in time of the various involved "signal elements" must be generated according to its "chronological distribution" (said also timing distribution), each "signal element" being generated according to the process which has just been set forth. In a given system, according to the invention, the "signal elements" will be in a coded form which results, generally but not exclusively, from a same type of coding operation for each of them. If finally, (as is generally the case) the analog signals are to be transmitted, decoders have to be used at the transmitter output stage; these decoders will generally be similar and the technological realizations will advantageously try to use a single decoder. These aspects modify by no means the invention all the more since the coding processes representative of a "signal element" can be of a well-known type such as Δ coding, PCM coding, . . . as seen in the preceding paragraphs.

Figure 3:
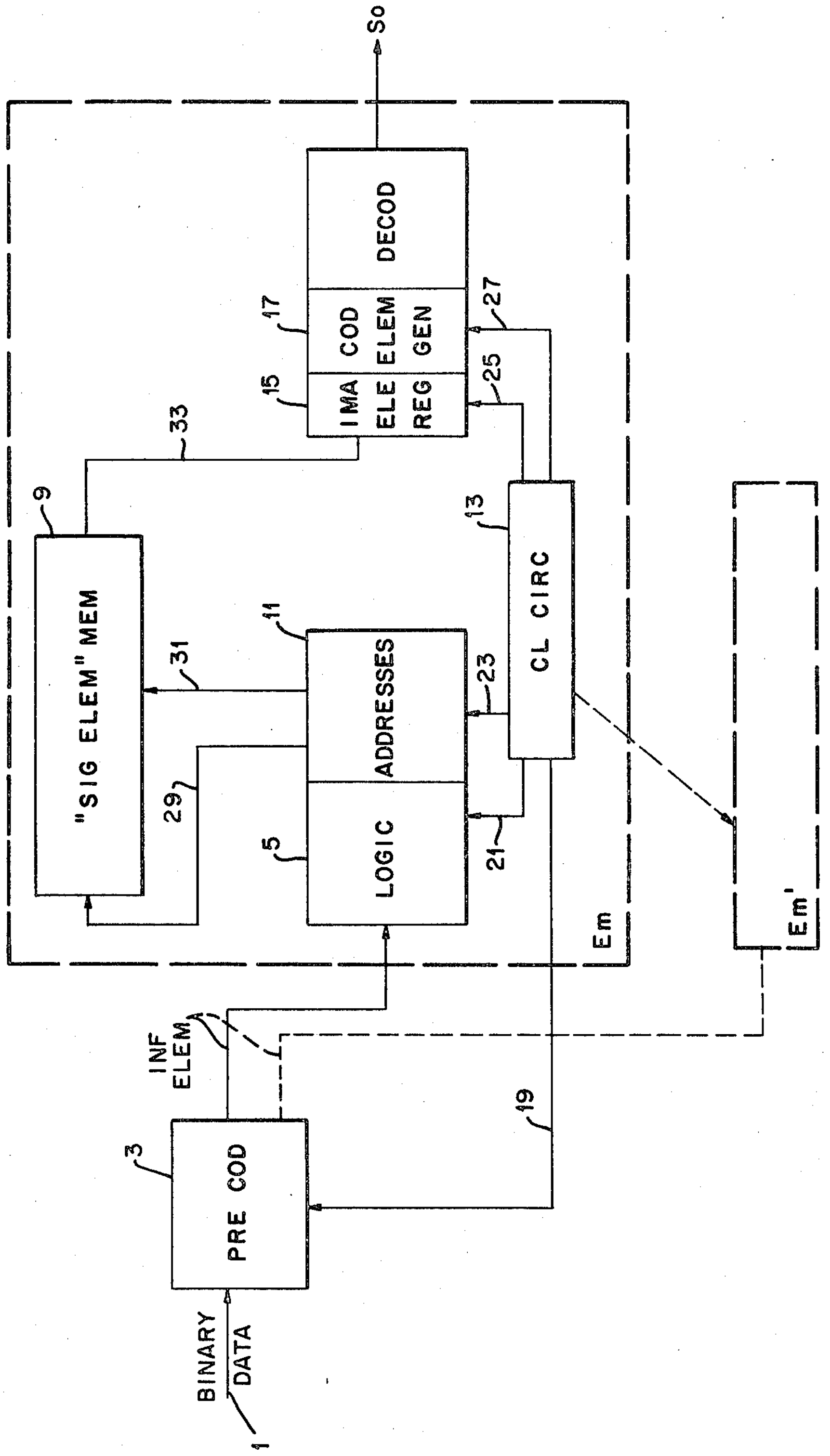
FIGS. 3 and 6 respectively show the general and detailed logic diagrams of the preferred embodiment of the multiphase shift modulator.

From the description of the process according to the invention which has just been made, it is possible to define a schematic diagram of a device in conformity with this invention, schematic diagram given on FIG. 3. In this FIG. E*m* designates the circuit assembly with which it is possible to generate the signal to be transmitted from the "information elements," the so generated signal being supplied out at So; Cl.Circ. designates the clock circuits which generate the necessary clock signals. This figure shows also circuits designated under the term "pre-coder"; such a device, which is not part of the invention, is often utilized to form the "information elements" from the basic data arriving at E*n*, which "information elements" will be processed for transmission. For instance, the incoming data being in the binary form, they can be gathered into pairs in order to form the "information elements" with four possible values; said "information elements" then, are processed according to the invention at E*m* to give, for instance, a four-phase signal if such a transmission mode has been chosen; in such a case, each of the phase corresponds to each of the four values of the information.

As to the transmitter E*m* according to the invention, there is found the memory Sig.Elem.Mem. wherein the images of the coded representations of the "signal elements" are memorized; the block designated "logic" receives the information elements, recognizes their values, owing to them determines the used "signal element(s)" and then determines the address of the memory positions weherein there is the image(s) of said "signal element(s)"; besides, since the required transmission mode is known, the sequence of the "signal elements" is known, since the coding mode of the "signal elements" is also determined, the finer sequence of the "code elements" to be generated is therefore known, sequence to which corresponds the reading sequence of the "image elements" from the memory. This leads to the fact that the logic block will produce, upon each chronological instant (said also timing instant), signals which give the addresses of the "image elements" to be read and this for each of the images which correspond to the "signal elements" which intervene at this instant. Thus, the logic block is at the origin of what may be called "generation chronology" of the signals. Besides, it is well-known that the number M of "signal elements" which intervene at any given instant is defined by the number of "signal elements" which corresponds to an "information element" and by the time length during which there is the effective influence of a "signal element," a time length which is a function of the required precision (the theoretical influence is infinite), and which is estimated under the form R/T with respect to the rate 1/T of the information elements; these various conditions are defined (outside of the present invention) by the chosen transmission mode. Thus, if the invention was applied to the example which has been illustrated in the prior art (with reference to FIGS. 1 and 2), the "information element" would be a couple of two binary data, the images to be stored would be those of the coded representations of the signals +c, −c, +e, −e; thus, if the first "information element" is 11 and the second one 10, vectors $\phi 0$ and $\phi 1$ of FIG. 1 may be caused to correspond to them, i.e., the signal $+c +e$ and $+c -e$.

Figure 4:
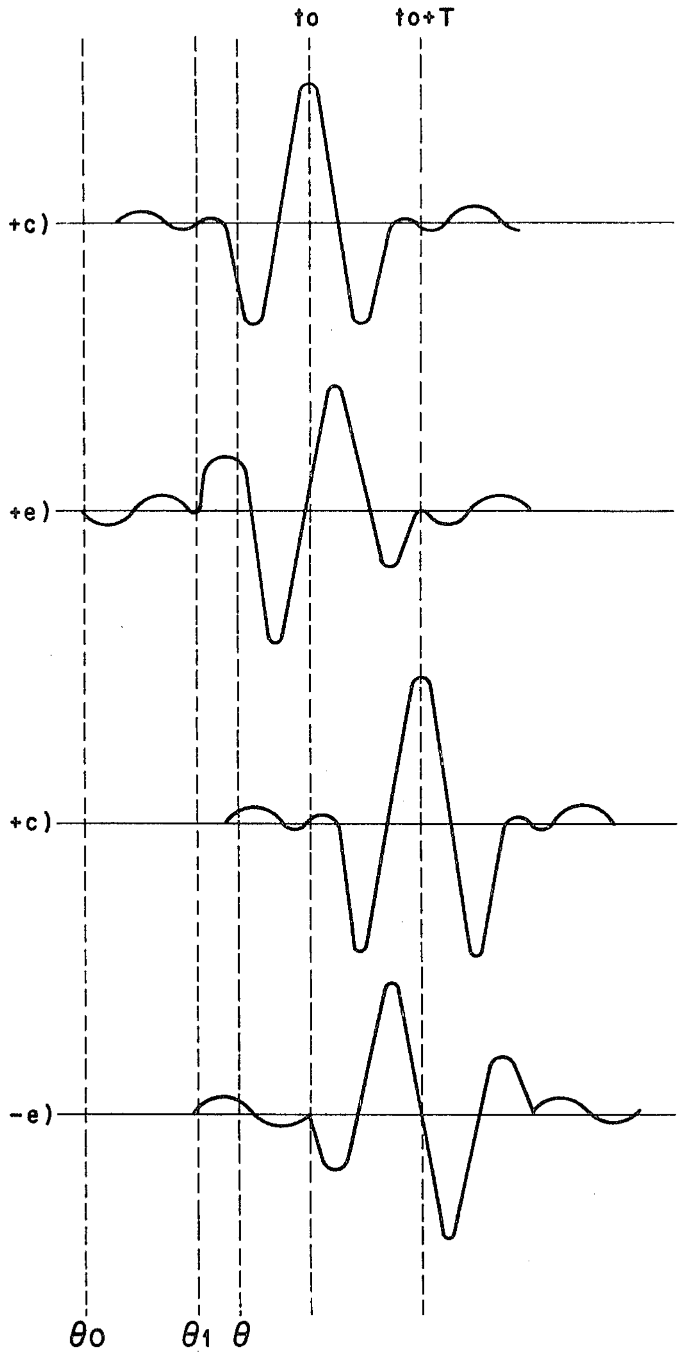
FIGS. 4, 5, and 7 show the modulated signal overlap or interference at a point in time.

Referring now to FIG. 4, there can be seen that at instant $\theta_0$ when information element 11 occurs, images $+c$ and $+e$ begin to be read from the memory. At instant $\theta_1$ when occurs information element 10, image of $-e$ begins to be read from the memory and then a new other reading of the image of $+c$ begins. Therefore, at a given instant $\theta$, are to be read from the memory: the image element of $+c$ which is to be read at this instant in the read operation begun at $\theta_0$, the image element of $+e$ to be read in read operation begun at $\theta_1$ and the image element of $-e$ to be read in read operation begun at $\theta_1$. In transmitter E*m* of FIG. 3, there are circuits which act as registers designated by Ima. Elem. Reg. which receive each "image element" read from the memory at a given instant. These "image elements," then entail the generation of the code elements to which they correspond (this, in circuits "COD.ELEM.-GEN."); therefore, and finally the succession of the different chronological instants, determines in the time the generation of the successive code elements for each of the "signal elements." These signal elements are recovered in the decoder and the combination thereof forms the resulting signal present at S*o*; as seen before, with some coding processes, it is possible to proceed to said combination first by combining the code elements and then by decoding the combination signals.

Considering the "signal element" of the type:

$$g(t)\cos(w_ct+\phi)$$

In the case under study, $g(t)$ is of the sin $X/X$ type for the first "signal element". Now, $g(t)$, in reference to instant $t_o$, is zero at each instant $t_o + KT$ except at $t_o$. Likewise, $g(t)$, in reference to instant $t_o + iT$, is zero at each instant $t_o + iT + KT$ *except at* $t_o + iT$ . . . ; $t_o$ is defined from the first "signal element" to be generated; it may be taken as the origin of the times and $t_o$ may be confounded with $t = 0$, $t_o$ being shown in FIG. 4 for the considered chosen example.

The sum of each of the "signal elements" must be:

Formula 1

$$\sum_i g(t-iT)\cos(w_ct+\phi i)$$

$\phi i$ is, in the general case, a function of the value of the $i^{th}$ information element. This value is one value among the $j$ possible values that may be assumed by an information element; therefore, this defines a corresponding family of $j$ values for the possible values of the terms $\phi i$. Therefore, when generating the signal of the $g(t)$ $(\cos w_ct + \phi o)$ type at instant $t_o = 0$, the signal of the $g(t)\cos(w_ct + \phi i)$ type at instant $iT$, these signals are generated by taking successively as reference instants, instants $t = t_o = 0$, $t = T$, $t = iT$, i.e., that are successively generated the signals corresponding to the expression $g(t-iT)\cos[w_c(t-iT) + \phi i]$ where $i = 0, 1$ . . . .

When generalizing the use of reference $i$T, formula 1 becomes:

Forumla 2

$$\sum_i g(t-iT)\cos[w_c(t-iT) + w_ciT + \phi i]$$

This is indicative that at instant $i$T, a signal of the type $g(t)\cos(w_ct + \phi'i)$; must be generated where $\phi'i$ is given by the value of the corrective term $w_ciT$ and by value $\phi i$ which is itself given by the value of the $i^{th}$ "information element" according to the law defined by the chosen transmission mode. The term $\phi'i$, practically, is not different from $\phi i$ if $w_ciT$ is a whole multiple of $2\pi$, even a whole multiple of $\pi$, the influence then being reduced to a question of sign.

The general case, according to the process of the present invention, would require the memorization of the images of each of the terms of the $g(t)\cos(w_ct + \phi'i)$ type, which is much more easily achievable than with the prior art processes. By imposing a relation less rigid than the relations assumed up to now between $w_c$ and $T$, the complexity of the general case can be reduced.

Consider, the design of a differential eight-phase modulation transmitter for a rate of 4,800 bit/sec. (with respect to the data to be transmitted) and the spectrum of which is appropriately centered within the telephone band. It should be recalled that the differential phase modulation avoids an absolute reference since the new phase is the previous phase + $\Delta\phi$, said $\Delta\phi$ being given by the value of the element to be transmitted. The 4,800 bits/sec. binary data are gathered into groups of three, thus defining information elements with eight possible values which are transmitted at the rate of 1,600 per second; therefore T = 1/1,600. From the known transmission modes, as disclosed in the above-mentioned patent applications, an 1,800 Hz 6db bandwidth centered on frequency $f_c$ will be obtained by generating the eight-phase signal by "signal elements," the type of which is given by:

$$\frac{\sin(\pi/T)t}{(\pi/T)t}\cos(w_ct+\phi_i)$$

Here, since the modulation is a differential modulation $$\phi_i\ \phi_{i-1} + \Delta\phi_i$$

besides, it has been considered the case where $f_c$ = 1,800 Hz therefore, the "signal elements" are of the type defined by $$\frac{\sin \pi\times 1600\times t}{\pi\times 1600\times t}\cos(2\pi\times 1800t+\phi_i)$$

with $$\phi_i = \phi_{i-1} + \Delta\phi_i$$

the possible values of $\Delta\phi_i$ being 0, $2\pi/8$, . . . $2\pi\times 7/8$.

With reference to the general formula 2 which has just been mentioned above, the "signal element" to be generated with reference to instant $iT$, i.e., for the $i^{th}$ information element, will have to be the "signal element" of the type defined by formula 2 which gives here:

$$\frac{\sin \pi\times 1600\times t}{\pi\times 1600\times t}\cos\left[2\pi\times 1800\times t+\frac{2\pi\times 1600}{1600}i+\phi_i\right]$$

$$\frac{\sin \pi\times 1600\times t}{\pi\times 1600\times t}\cos[2\pi\times 1800t+2i\pi 9/8+\phi_i]$$

$$\frac{\sin \pi\times 1600\times t}{\pi\times 1600\times t}\cos\left[2\pi\times 1800t+i\frac{2\pi}{8}+2i\pi+\phi_i\right]$$

The term $2i\pi$ is cancelled since it does not intervene in the function.

In the chosen transmission mode there are $2\pi/8$ possible values, the term $\phi_i$. There is therefore the case where $\phi_i$, plus the corrective element, $i\ (2\pi/8)$, gives a value which belongs to the family of the values possible of $\phi_i$. Correction $w_ciT$, here in practice equal to $i\ (2\pi/8)$, is the correction referred to with respect to the first signal of the serial. Since, for each signal, the correction corresponding to this one is made, the correction for signal $i$ will be made by modifying by $2\pi/8$, (in the considered case) the corrected signal which is generated for $(i-1)$. In addition, in the considered case $\phi_i = \phi_{i-1} + \Delta\phi_i$ (as specified at the beginning of the description of the example). In definitive, there is obtained:

$$\underbrace{\phi_i + i\frac{2\pi}{8}}_{\phi'i} = \underbrace{\phi_{i-1} + (i-1)\frac{2\pi}{8}}_{\phi'_{i-1}} + \Delta\phi_i + \frac{2\pi}{8}$$

Since, as seen above, the terms $\Delta\phi_i$ have for possible values $k \times 2\pi/8$ with $k = 0, 1, 2, \ldots$ therefore, all the "signal elements" will be obtained, which are to be used, from the types defined by (1) $$\frac{\sin \pi\times 1600t}{\pi\times 1600t} \cos\ (2\pi\times 1800t)$$

(2) $$\frac{\sin \pi\times 1600t}{\pi\times 1600t} \cos\left(2\pi\times 1800t+\frac{2\pi}{8}\right)$$

. . .

. . .

(8) $$\frac{\sin \pi\times 1600t}{\pi\times 1600} \cos\left(2\pi\times 1800t+2\pi\ \frac{7}{8}\right)$$

Therefore, when memorizing the images of these 8 "signal elements," the $(i-1)^{th}$ signal being defined by its address, the address of the $i^{th}$ will be the address of the $(i-1)^{th}$ modified by $k_i+1$, where 1 is due to thecorrection of $2\pi/8$ and where $k_i$ is given by $\Delta\phi_i = k_i\ (2\pi/8)$ which is determined by the value of the $i^{th}$ information element. As to the "signal elements" themselves, any "signal element" is theoretically infinite and the approximation is all the better as a wider portion is taken from either part of the central reference of said "signal element." Its influence, then, is over a more or less long time interval; in the case under study, technological considerations and simulation results have extended it over a time length equal to 6T ($1/T$ = information element rate).

Figure 5:
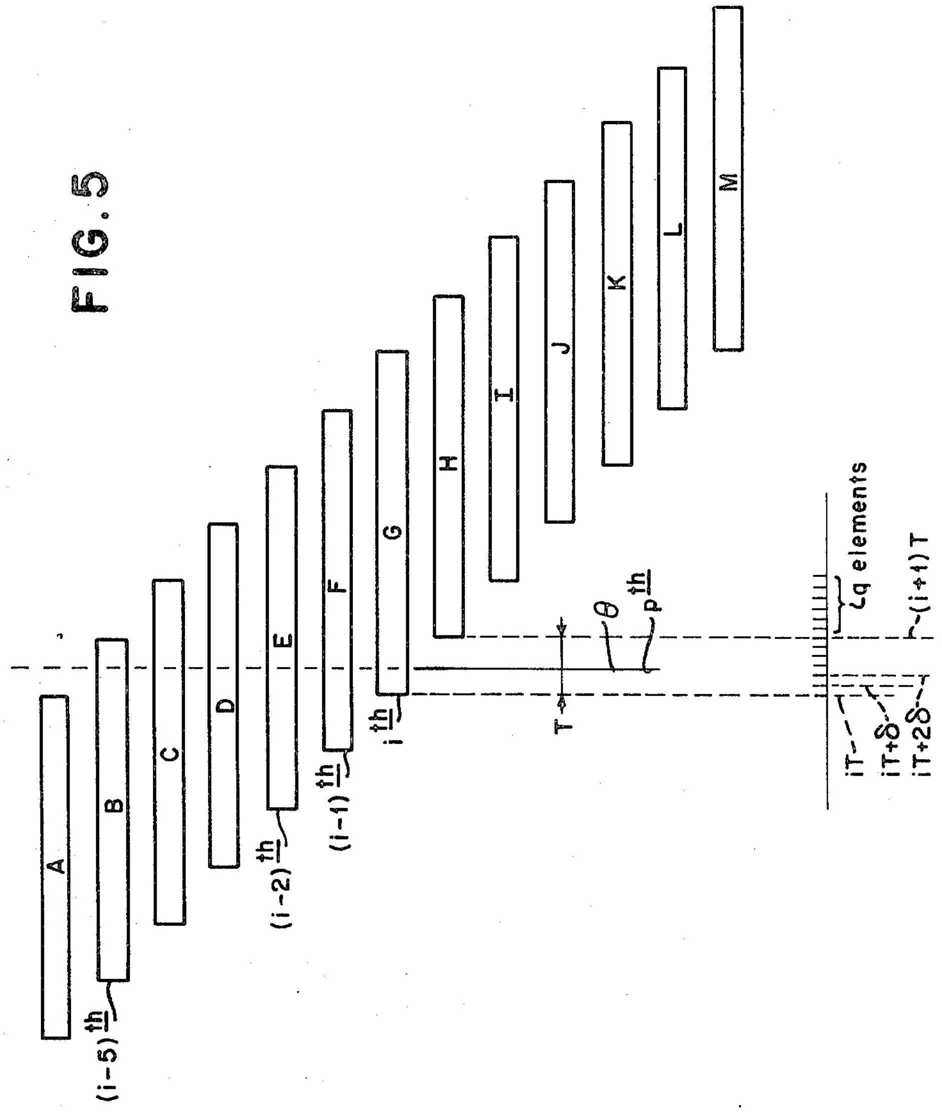

This means that the generation of a "signal element" being started, will be still in progress after five other generations of "signal elements" have been started; at a given instant, there are six "signal elements" which interfere as schematically shown in FIG. 5 for the present example.

In the present case, only one "signal element" corresponds to one information element; it has been seen that cases exist where more than one "signal element" correspond to an information element. In the general case, the number M of "signal element" to be considered at a given instant is given by the number of "signal elements" corresponding to one information element and by the duration of the time NT over which a "signal element" extends its influence. Here, the conditions of the example, entail that $M=N$ with, in addition, $R=6$.

The coding which has been chosen to represent the "signal elements" is the Δ coding; therefore, any image is a determined succession of values 0 or 1 which are memorized. As stated previously in the study of the process, as these values are read from the memory, or extracted, they will here cause the Δ code pulses to be generated which pulses, when decoded, reproduce the "signal element" in the analog form. Since the "signal element" extends, as seen above, over a time length NT, preferentially, it is coded in $Rq$ Δ elements. If $1/\delta$ designates the rate of the Δ elements there is obtained the relation:

$RT = Rq\delta$    $\delta$ is the time length of a step of the Δ coding.

$\delta = T/q$

When it is the $p^{th}$ element (p being comprised between 1 and $q$) of the $i^{th}$ "signal element" which intervenes (here, the "signal element" which corresponds to information element G), are also intervening the $(p+q)^{th}$ element of the $(i-1)^{th}$ "signal element," the $(p+2q)^{th}$ element of the $(i-2)^{th}$ "signal element," . . . , the $(p+(R-1)q)^{th}$ element of the $[i-(R-1)]^{th}$ "signal element" at instant $\theta$ called also $p^{th}$ as shown in FIG. 5, (in the case of the example, it is recalled that $R=6$).

The same coincidence exists as to the "image elements" of the images corresponding to said "signal elements." Therefore, the addresses of the "images elements" to be extracted are given by the order $p$ and by the addresses of the six images; the six addresses ($i$, . . . $i-5$) will remain valid from instant $iT$ to instant $(i+1)$ $T$ where they are replaced by addresses $i+1$, $i$, . . . $i-4$.

Figure 6:
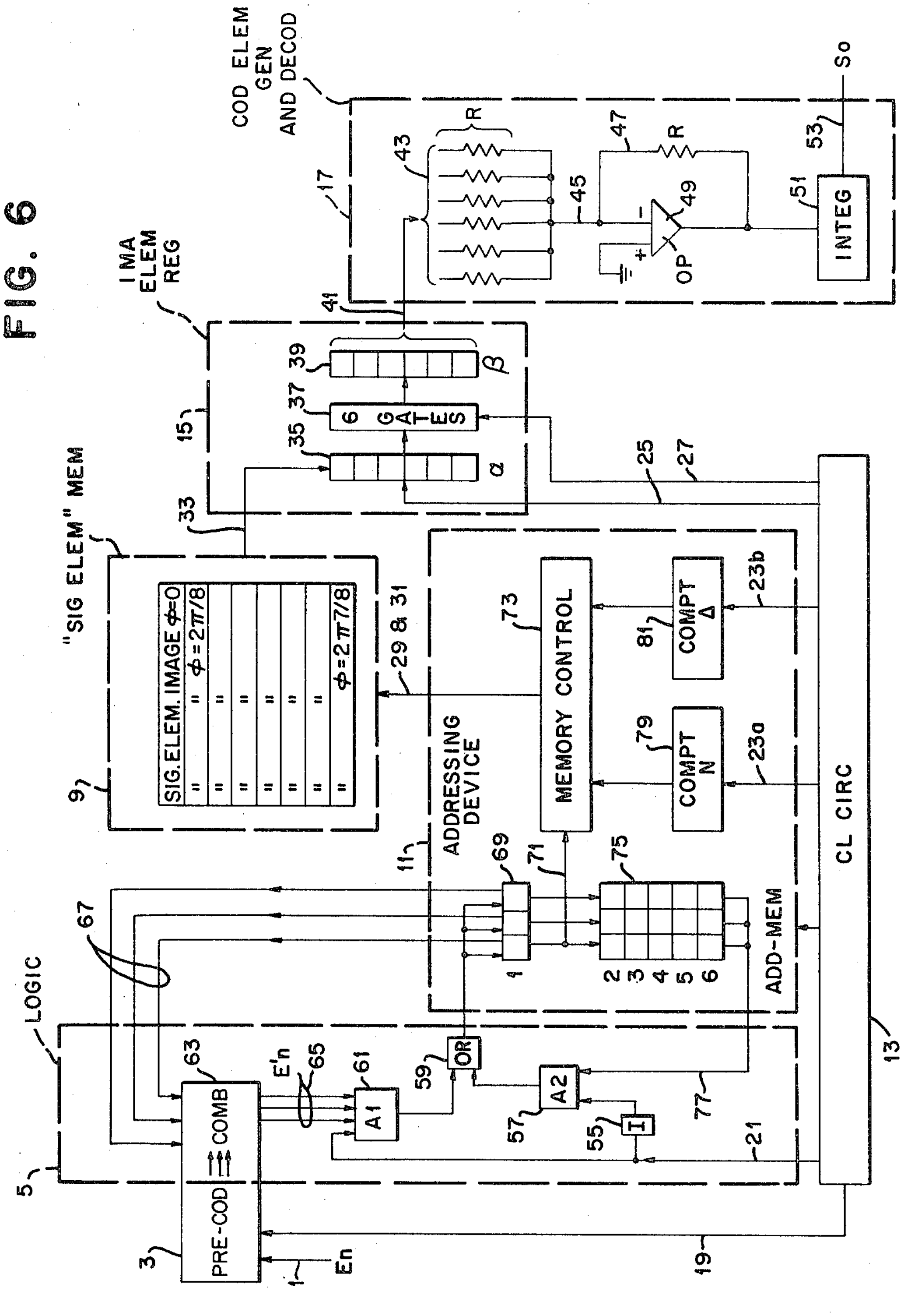

When considering FIG. 6 which is the schematic diagram of the device, it can be observed that the data reach En on the precoder 3 where, as they are grouped by three, they form the "information elements." The "information elements," here, are represented by the association of three bits; these three bits might have been directly those of the three data. Here, they are obtained from the three binary elements of the data upon a GRAY code transformation which is not strictly connected to the invention. The three encoder bits are logically added in combiner 63 to the three bits which are representative of the address of the image dealing with the $(i-1)^{th}$ element. The $i^{th-1}$ address is present until instant $iT$ in position 1 (element 69) of the address memory Addr. Mem. 11. During this adding operation, an additional 1 is still introduced in order to take the corrective term into account. The new so-formed address at $En'$ occurring instant $iT$ is the $i^{th}$ address and it assumes position 1 in the address memory. The addresses $i-1$ . . . $i-5$ then assume position 2, 3, . . . 6 in element 75. Then, as shown in FIG. 5, the element of order 1 of the $i^{th}$ image is extracted; this element is defined by the $i^{th}$ address present at position 1 in the address memory and by its order represented, for the values within 1 and $q$, by the value present in COUNTER Δ (see FIG. 6), a value which is here equal to zero for order 1.

Element $1+q$ allotted to the $(i-1)^{th}$ term etc. must also be extracted, as seen above, until element $1+5q$ of the image allotted to the $(i-5)^{th}$ term.

This extraction may be of the parallel type; here, it is made in series but at such a rate that all these extractions are made before proceeding to the following step of the delta coding which starts at instant $iT+\delta$, as shown in FIG. 5. The procedure is as follows: as soon as the $i^{th}$ address is at 1, the memory ADDR.MEM. is caused to be independent by disconnecting AND circuits A1 and it is cycled through AND circuits A2. The address of the $(i-5)^{th}$ image reaches position 1, "COUNTER Δ" is loaded with 0 and another counter, the so-called "COUNTER N" the output of which is given weight $q$, is loaded with $(R-1)$, here $R-1=5$, and the $(5q+1)^{th}$ "image element" of the $(i-5)^{th}$ "signal element" is read from the memory. Then, the address of the $(i-4)^{th}$ image reaches position 1, COUNTER Δ remains at position 1 and count N will assume value $(N-2)$ and the $(4q+1)^{th}$ "element image" of the $(i-4)^{th}$ "signal element" is read from the memory, etc . . . . Finally, the first "image element" of the $i^{th}$ "signal element" is read from the memory.

The "image elements" extracted from the memory are successively introduced into part $\alpha$ of the "image element" register 15. When the first "image element" of the $i^{th}$ signal has been extracted, instant $iT+\delta$ is reached where the following step of the delta coding is started, and the series-extractions will be started anew: the $(2+5)^{th}$ "image element" is extracted from the $(i-5)^{th}$ element, etc . . . until the $2^{nd}$ "image element" of the $i^{th}$ "signal element." During these operations, the addresses have been cycled another time, the contents of "COUNTER Δ" has stepped to value 1 at the very beginning of this new series of operations, and then, has remained to value 1 and the contents of "COUNTER N" has progressed anew from 5 to 0, the successive values of its output being equal to $5q$, $4q$, $3q$, $2q$, $q$, 0. Before starting the series of operations corresponding to this new step, the "image elements," which were extracted and have filled $\alpha$ were transferred to $\beta$ through gating circuits. While $\alpha$ is filled with the new elements being extracted, the "image elements" present at $\beta$ enable the coresponding code elements to be generated. The successive extractions occur up to step $iT+q$, inclusive; then, instant $(i+1)T$ is reached and the $(i+1)^{th}$ information element appears; the $(i+1)^{th}$ address is calculated; it replaces the $i^{th}$ address and the complete cycle is started anew. Thus, the progression is made from instants $iT$ to $(i+1)T$, $(i+2)T$, all the "image elements" are appropriately extracted. Consequently, the signal to be transmitted is appropriately generated. In the case under study, it is not the analog "signal elements" obtained after the decoding operations which are summed up, but the code elements for each step which are summed up, the signals resulting from the successive steps being sent to an integrating means. This is not specific to the invention but is due to the properties of the Δ coding; the code elements are generated by applying a voltage ±V to each of the resistors R according to the corresponding values present at $\beta$ and the summation and decoding operations are carried out by the connection of said resistors to operational amplifier OP, followed by the integrator. The "Memory Control" circuits receive the addresses and are used for the reading of the memory according to the chosen type of memory. Since images of the "signal elements" are registered once and for all, an advantageous type of memory is the Read Only Memory, which is well-known in the art.

Figure 7:
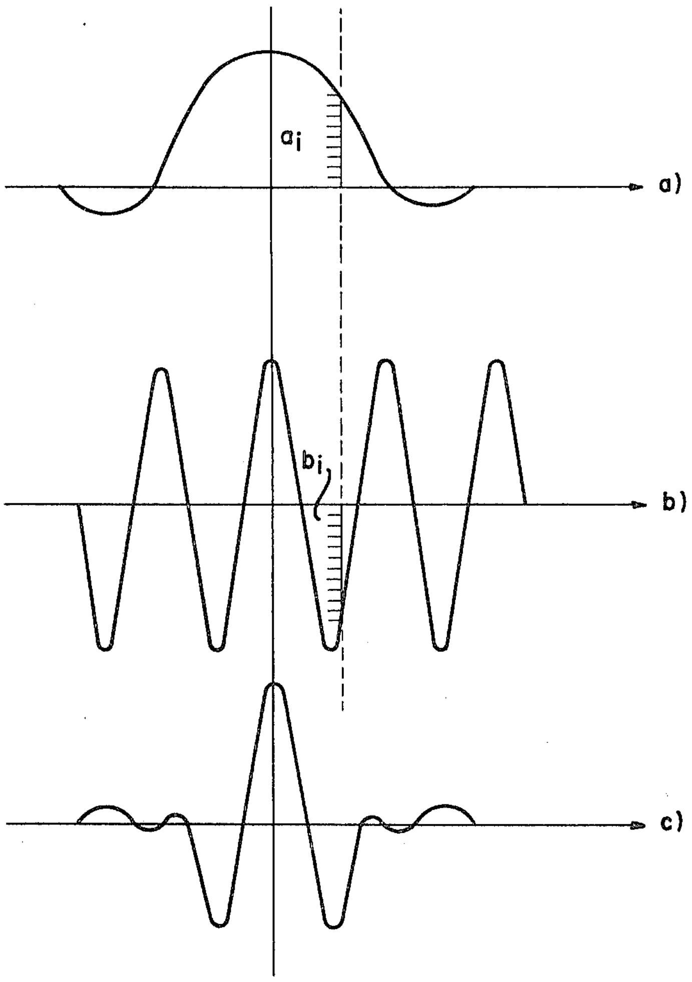

The images of the code elements have been memorized according to a given coding of "signal elements" of the g(t) cos $(w_c t + \phi)$ type, which in the above-mentioned examples, becomes of the (sin $X/X$) (cos $w_c t + \phi$) type. The images of the coding of the composing sub-elements can be registered separately: the image of the coding of $g(t)$, here, sin $X/X$ and the images of the coding of cos $(w_c t + \phi)$, and even, the image of cos $w_c t$, only. The extraction of the "image elements" would then, lead to the generation of the function $g(t)$, (here sin $X/X$), and to the generation of the function (cos $w_c t + \phi$) either directly or by generating simply cos $w_c t$ and recreating the phase $\phi$ upon action on the generation instants; a multiplication of the two so-generated functions reproduces functions $g(t)$ cos $(w_c t + \phi)$ namely (sin X/X) cos $(w_c t + \phi)$ in the disclosed examples. This multiplication can be made in the digital manner. Indeed, with reference to FIG. 7, signals $a$, $b$, $c$, of FIG. 2, will be considered again. Signal $c$, the image of the code elements of which is registered, is the product of $b$ by $a$ and, according to the foregoing, the images of the code elements of a can be registered as well as the images of the code elements of $b$. Thus, if a) and b) are PCM-coded, the images $a_i$ and $b_i$, which are each formed of a number of bits, are multiplied in multiplying circuits which may be of different types: examples of such circuits are particularly given in the book entitled "Digital Computer Components and Circuits" by R. K. Richards.

It is clear that the preceding description has only been given as an unrestrictive example and that numerous alternatives may be considered without departing from the spirit and scope of the invention.

What is claimed is:

1. In an M phase shift modulator having combining means (17) for forming a succession of weighted analog signals suitable for serial transmission, the modulator further comprising:

- a memory (9) for storing in $M$ addressable locations coded equivalents of phase shift increments each equivalent consisting of $N$ bits;
- a logic arrangement (1, 3, 5) responsive to successive groups of data bits of base $b$ taken $N$ at a time and occurring at the rate of $N/T$ for generating corresponding ones of at least $b^N = M$ distinct memory addresses; and
- means (11, 15) responsive to each successively generated memory address from the logic arrangement for extracting the coded phase shift increment from the corresponding locations and applying it to the combining means, said means including means (61, 57, 81, 79) operative and interactive with the logic arrangement for address modifications during $N$ consecutive time increments within any time interval $T_i$ for extracting from the memory during the first increment the respective $p$, p+1, p+2, – – – $p+N-1$ bit from corresponding addresses $M_i$, $M_{i-1}$, – – – $M_{i-(N-1)}$, and extracting during the second increment the respective $p+1$, $p+2$, $p+3$ – – – $p+N$ bits from corresponding addresses $M_i$, $M_{i-1}$, – – – $M_{i-(N-1)}$, the extractions repeating up to the $N^{th}$ time increment, whereupon at the occurrence of time interval $T_{i+l}$ , the extractions are re-initiated with $p$, $p+1$, – – – $p+(N-1)$ bits being obtained from the corresponding addresses $M_{i+1}$, $M_i$ – – –.

2. In a phase shift modulator according to claim 1, wherein:

the extracting means includes:

a memory address register (73);

shift register means (69, 75) for storing N successively generated memory addresses and for copying the contents of a preselected shift register stage (69) into the memory address register;

the logic arrangement includes:

a code converter (3) for generating the addresses;

means (63, 67) for logically modifying each address generated by the converter by the contents of the pre-selected shift register stage; and gating means (65, 61, 59, 57, 55) for disabling the code converter and concurrently entering the modified memory address and followed by the contents of the $N^{th}$ shift register stage into the preselected shift register stage.

3. In an M phase shift modulator according to claim 1, wherein the logic arrangement further includes clocking means (13, 19, 23, 25, 27) for enabling the converter at a rate not less than 1/RT.

4. In a modulator having combining means (17) for forming a succession of weighted analog signals suitable for serial transmission, the combination comprising:

a memory (9) for storing in $M$ addressable locations digitally encoded signals of $N$ bits each;

a logic arrangement (1, 3, 5) responsive to groups of $N$ data bits in base $b$ occurring at a rate of $N$ every $T$ seconds for generating respective ones of $b^N = M$ distinct memory addresses:

means (11, 15) responsive to each successively generated memory address derived from the logic arrangement for extracting the digitally encoded signals from the corresponding location and applying them to the combining means, said extracting and applying means further including means (61, 57, 81, 79) operative during N consecutive time increments within any time interval $T_t$ for extracting from the memory during the first increment the $p^{th}$ bit from address $M_t$, the $p+1$ bit from address $M_{t-1}$, – – – the $p+N-1$ bit from address $M_{t-(N-1)}$, and extracting during the second increment the respective $p+1$, $p+2$, – – – $p+N$ bits from the corresponding addresses $M_t$, $M_{t-1}$, – – – $M_{t-(N-1)}$, the extractions repeating up to the $N^{th}$ time increment whereupon at the occurrence of time interval $T_{t+1}$ the extractions are re-initiated with the $p$, $p+1$ – – – $p+N-1$ bits being obtained from the corresponding addresses $M_{t+1}$, $M_t$ – – – ; and the combining means further includes means (43, 47, 49, 51, 53) for algebraically summing simultaneously those bits extracted during any one time increment.

* * * * *